Feb. 3, 1970

A. L. KOCHES 3,493,115

CAM LOCK CARTRIDGE SYSTEM

Filed Jan. 29, 1968

ANDREW L. KOCHES

*INVENTOR.*

George B. Oujvolk

ATTORNEY

Feb. 3, 1970  A. L. KOCHES  3,493,115

CAM LOCK CARTRIDGE SYSTEM

Filed Jan. 29, 1968  2 Sheets-Sheet 2

ANDREW L. KOCHES
INVENTOR.

George B. Cujwik
ATTORNEY

United States Patent Office 3,493,115
Patented Feb. 3, 1970

3,493,115
CAM LOCK CARTRIDGE SYSTEM
Andrew L. Koches, Old Saybrook, Conn., assignor to Ultra Tech Corporation, Old Saybrook, Conn.
Filed Jan. 29, 1968, Ser. No. 701,483
Int. Cl. B01d 35/02
U.S. Cl. 210—238                                5 Claims

ABSTRACT OF THE DISCLOSURE

According to the present invention, a cam attached to a handle slides a locking follower. The locking follower is in axial alignment with a fluid pipe and slides a sufficient distance to permit the insertion of a work unit cartridge at a work station in order to clamp the cartridge to the locking follower under great pressure. The arrangement when opened permits the cartridge to drop out of the work station. A new cartridge can be inserted and the closure action exerts thrust against the cartridge. Valve means are provided to temporarily stop the fluid flow during the change operation. The system herein described can be used to hold filters, cannisters, vibration dampers, line strainers or in fact almost any device that requires fitting and easy removal in a fluid pipe line.

BACKGROUND OF THE INVENTION

The present invention relates to the insertion and removal of in-line work units in flow systems and more particularly to the insertion and removal of work units such as filters at a particular work station of a pipe or tube system when liquid is flowng through the system.

Most fluids, i.e., liquids and gases processed today are pumped through pipes from one processing station to another. Many solids such as plastics were at one stage of their manufacture flowable fluids. In many of these areas a removal of solid particles such as contaminants is required and to this end many products are filtered when in the liquid state. Some filters are relatively crude such as in coarse fuel oils, typically Bunker C. In other fuels, such as jet fuels or in rocket fuels more sophisticated filters are used. Finally in the food and drug industry very fine filters are utilized some of them in the submicron ranges.

Many filters today are attached to the pipe lines by means of pipe unions. Others have large cannisters with screw lids and internal O-rings. There are many many more types but in none so far as I am aware can the filter means be removed in one simple motion without unscrewing or unbolting components.

Furthermore, in most filter units which are attached to the pipe line by means of junction arrangements, the removal of the filter creates a gap in the pipe line with no connection between the pipe line ends. It becomes difficult to re-align the pipe and very often more difficult to replace the filter. Simply stated no present filter that I know of has a simple locking action by which filter means can be removed from a pipe line in one simple action and readily replaced in the same manner. No commercial in-line filter can be removed from a line without misaligning the pipe ends.

Briefly stated, according to the present invention, a cam attached to a handle slides a locking follower. The locking follower is in axial alignment with a fluid pipe and slides a sufficient distance to permit the insertion of a work unit cartridge at a work station in order to clamp the cartridge to the locking follower under great pressure. The arrangement when opened permits the cartridge to drop out of the work station. A new cartridge can be inserted and the closure action exerts thrust against the cartridge. Valve means are provided to temporarily stop the fluid flow during the change operation. The system herein described can be used to hold filters, cannisters, vibration dampers, line strainers or in fact almost any device that requires fitting and easy removal in a fluid pipe line.

Other objects and many additional advantages will be more readily understood by those skilled in the art after a detailed consideration of the following specification taken with the accompanying drawings.

DETAILED DESCRIPTION

Figure 1:
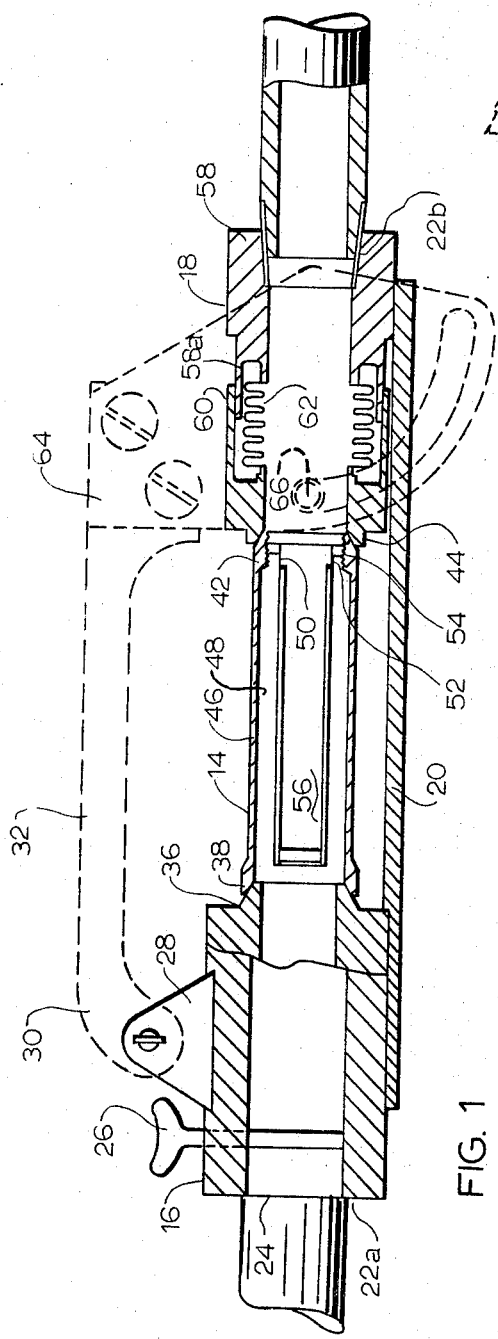
FIGURE 1 shows a longitudinal cross-sectional view of the apparatus herein contemplated in the closed position with a working unit inserted.
Figure 2:
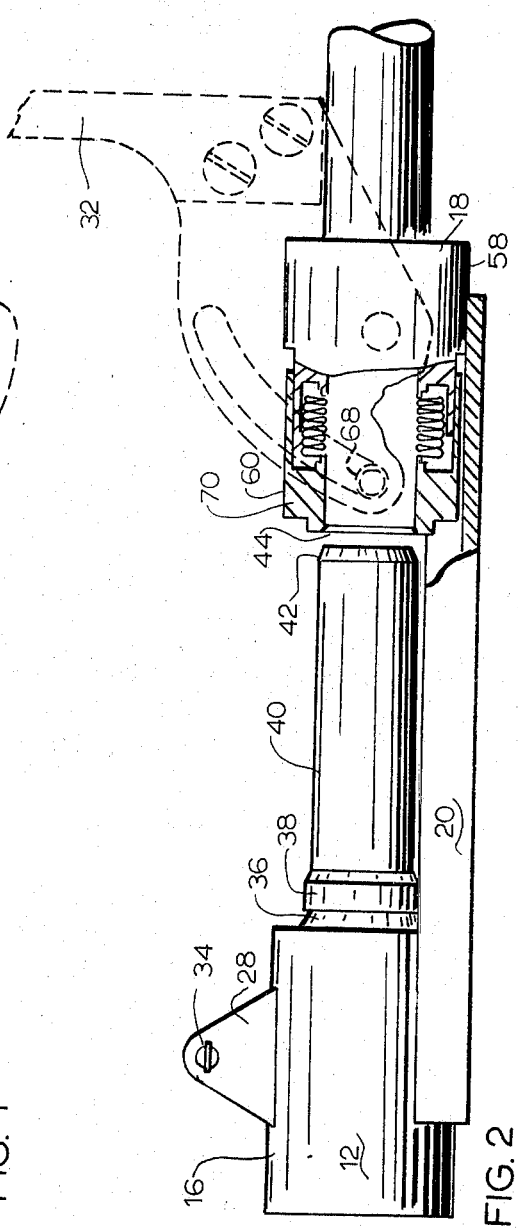
FIGURE 2 is a longitudinal partially cross-sectional view of the apparatus shown in FIG. 1 but in the open position.

Shown in FIGS. 1 and 2 is an elongated straight structure which serves as a cam lock cartridge holder 12 which holds a filter-containing cartridge 14. Cam lock holder 12 has an upstream section 16 and a downstream section 18. These two sections of the apparatus are connected by a yoke 20 which can hold the two sections rigidly in place. At both ends of the structure are threaded apertures 22a, 22b to securely receive tubes or pipes of a flow system.

Considering first the upstream section 16, there is a passage 24 to allow flow of the fluid through that section. Also shown on the upstream section is a valve 26. However, this valve need not form part of the apparatus and indeed may be located upstream of the apparatus. Upper section 16 is generally a hollow cylinder having thereon a lock 28 for receiving the outer end 30 of a cam handle 32, and can securely lock the outer end against removal by means of locking lugs 34. Towards the outlet end of the upstream section is an upstream chamfer 36. Over this chamfer will fit the upstream section of work unit or cartridge 14 which will have a corresponding mating funnel 38 so designed that the chamfer will dovetail into the funnel. If necessary, an O-ring can be provided at the base of the chamfer so as to form a gas tight seal.

Cartridge 14 consists of an elongated cylindrical hollow body 40 and on the downstream end thereof is a cartridge chamfer 42 quite similar to upstream section chamfer 36. Cartridge chamfer 42 will in turn dovetail into a corresponding downstream mating funnel 44 on the downstream section 18.

The cartridge cylindrical hollow body forms an outer jacket 46 with an inner wall 48 terminating in a tapered neck 50 on the downstream side. This tapered neck 50 ends in an inner collar 52 with internal threads 54. This internal collar (with other internal fittings with transverse openings which are often not required and therefore not shown) support an internal filter 56. Internal filter 56 is also a hollow cylindrical body. The filtering material is preferably cylindrical and made of porous metal so that the fluid flow across the filter tends to cross the filter almost tangentially, depositing the unwanted solids around the filter. These unwanted solids accumulate between the outer jacket inner wall and the filter, building up from the downstream side. It is also possible to place filter material radially at the upstream end of the filter but with some substances this often has the tendency of clogging the filter too soon, or if the filter material has any thickness the area is decreased considerably.

Figure 3:
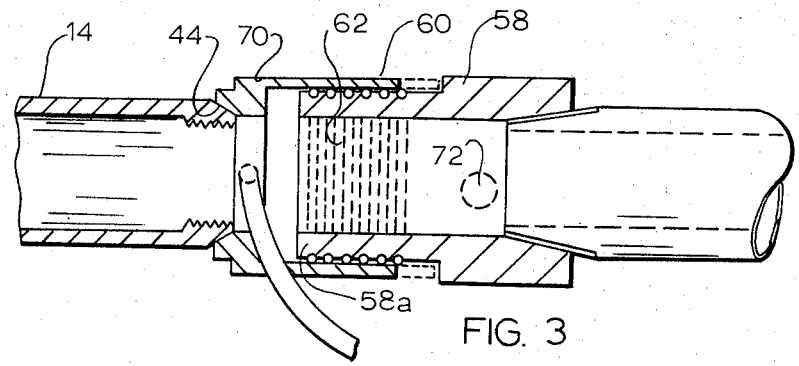
FIGURE 3 depicts a simplified version and explanation of some of the features of FIG. 1 in a longiutdinal cross-sectional view.
Figure 4:
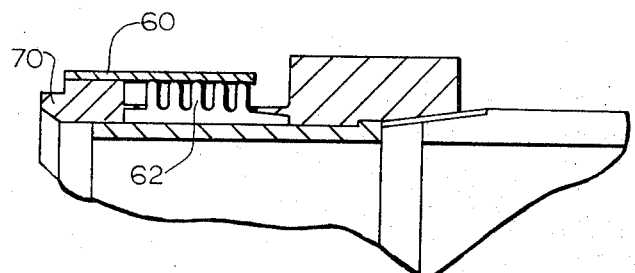
FIGURE 4 presents a fragmentary longitudinal cross-sectional position or modified embodiment of the apparatus shown in FIG. 1.

The downstream section of the apparatus forms the most important part of the inventive concept. This section, as can best be understood from FIG. 3 has a fixed inner cylinder 58, with a neck 58a, telescoping outer cylinder 60, and bellows 62. As will be seen this telescoping outer cylinder 60 wherein the locking follower includes downstream funnel 44 will move axially over fixed inner cylinder 58 to permit the removal of cartridge 14.

As previously mentioned, on the input side of telescoping outer cylinder 60 is downstream funnel 44 which forms part of a locking follower. The bellows 62 provides a fluid tight seal between inner and outer cylinders 58, 60.

The unit in the closed position, is shown in FIGURE 1. The locking action is provided by means of a cam arrangement 64 which in the closed position provides considerable pressure on a toggle pin roller 66 designed to roll axially with respect to the tubes or pipes of the system. The toggle pin roller 66 in turn transmits this pressure horizontally to a toggle pin 68. The toggle pin 68 is attached to the telescoping outer cylinder locking follower 70. The locking follower 70 is provided with the mating funnel 44 which holds, locks and seals the cartridge 14 between upstream chamfer 36 and downstream funnel 44. The two sections namely the upstream section 16 and downstream section 18 are rigidly held by means of an integral yoke 20. The sliding or telescoping outer cylinder is permitted to move horizontally and in a lesser manner vertically by means of bellows 62 which is connected by means of a fluid tight seal to both the inner and outer telescoping cylinders. The bellows provides a continual closure for the fluids, i.e., liquids and for gases carried in the pipeline at any known pressure and can be made out of many known materials which provide resistance to high and low temperatures, corrosiveness, wear and pressure. The seal at the mating points can be metal to metal or metal to plastic or plastic to plastic. A seal can be provided by means of O-rings or gaskets. Also another way of sealing is to coat the touching surfaces with Teflon or some other pliable inert substance.

Figures 5, 6:
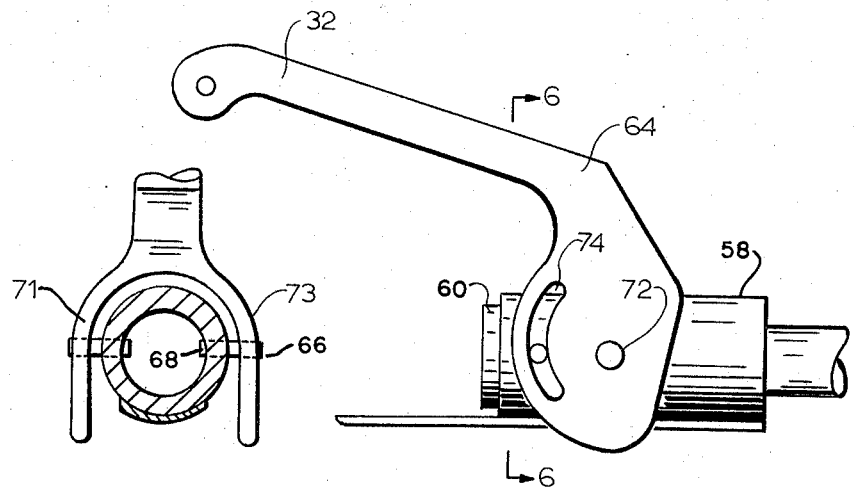
FIGURE 5 is a side elevation of the cam action used in the apparatus of FIG. 1.
FIG. 6 is a sectional view along lines 6—6 of FIGURE 5.

Turning now to FIGS. 5 and 6 and considering this apparatus just described, there is on the downstream side a fixed inner cylinder 58, a telescoping outer cylinder 60 and a bellows 62 connecting these. The telescoping outer cylinder is moved axially with respect to the inner cylinder by means of a cam handle 32 which in the closed position has its outer end locked in cam lock 28. The cam handle inner end has two cam plates 71 and 73 which straddle the downstream section (see FIG. 6).

Cam plates 71 and 73 move about a fulcrum 72 which is affixed to fixed inner cylinder 58. Each of the cam plates 71, 73 has a defined arcuate path of travel 74 (of which only one is shown) which engage toggle pin roller 66, as the toggle pin roller 66 is forced to travel along this arcuate path it forces the toggle pin 68 to move axially against the spring bellows. The lifting of the handle moves the toggle pin towards fulcrum 72 and away from the filter cartridge. The lowering of the handle moves the pin towards the filter cartridge and away from the fulcrum 72.

As the toggle pin is connected to the outer cylinder 60, the cam action moves the cylinder telescopically in the axial direction and slightly in the radial direction if necessary.

Operation of the apparatus

With the apparatus in the closed position, the cam handle 32 is in the longitudinal position and the end of the cam handle is locked in the cam lock. Cartridge 14 is in line with the cartridge holder and held between the upstream and downstream sections by the chamfer and funnel arrangement. The telescoping outer cylinder is extended outwards.

If it is now necessary to change filter cartridges, e.g., if the filter is clogged, the valve upstream is first shut and the cam lock is unlocked. The handle is turned or raised to a position at right angles or vertical to the flow system. This action swings the cam which forces the moving toggle pin to move axially in the direction of the cam fulcrum. The toggle pin is fastened to the locking follower of the telescoping outer cylinder. This drives the entire outer cylinder axially away from the cartridge until the downstream end of the outer cylinder strikes a boss on the fixed inner cylinder.

The cartridge is then removed, the new cartridge is inserted in its place and fitted to the upstream section. The cam handle is moved towards the former position. The spring bellows urges the locking follower towards the cartridge. The cartridge chamfer enters the mating funnel of the locking follower. As the handle end enters the lock, the lock is closed and the new filter cartridge is now securely in place. The valve is now opened. Thus, the device is designed to provide a positive, simple in-line filter or other work unit using a cam-lock type handle which allows sufficient movement in the structure for the installation of a filter element without disturbing the original installation.

There can be fixed pieces or rotating end pieces on either end of a rugged structure. These pieces have standard pipe threads to accept mating assembly. Once the ends have been joined, with proper fittings, the use of a valve in the structure or on either side of the installation will eliminate spillage while filter element is removed.

With the main body or housing installed directly in line with flow liquids or gas, the cam type handle is brought upward in an arc so that the handle is perpendicular with the flow line. This provides a clear unobstructed view of the inner portions of the work unit. The inside surfaces have been made to provide instant visual comparison with mating filter cartridges. By the inherent design, there is just enough space to accept the filter cartridge only when installed in the correct manner.

Once the filter element is in position, the cam type handle can be lowered. With this action two things occur. The sliding member attached to the cam handle of the main housing unit moves inward and at the same time affords a complete metal contact seal between filter and body.

The sliding telescoping cylinder is also provided with a Teflon O ring, which establishes complete sealing.

A simpler version of the system can be constructed by eliminating the first section 16. In this case the simpler apparatus is inserted between first and second hollow line segments, and at least one extremity of the apparatus is coupled onto the flow line of at least one of the segments. In this simpler apparatus there is a hollow fixed inner cylinder 58 leading to said one extremity and a hollow telescoping outer cylinder 60 disposed over the fixed cylinder for axial movement with respect to the fixed cylinder. The telescoping cylinder has an inlet or funnel 44 facing away from said coupled extremity. The inlet or funnel 44 is so constructed as to match a corresponding outlet on a fluid treating work unit inserted between line segments to form a fluid-tight seal between said inlet and outlet. Bellows 62 between the cylinders maintains a constant fluid seal therebetween during axial movement of the telescoping cylinder. The fixed cylinder 58 also has an extension 58a for forming a solid yoke between line segments extending between the fixed cylinder and the other line segment separating said segments rigidly and defining the work station for insertion of a fluid treating work-unit threat. Engaging the telescoping cylinder are cam means for axially moving the telescoping cylinder so as to engage and disengage said telescoping cylinder inlet with said work unit outlet.

The cam means in either case include a cam fulcrum on the fixed cylinder 58, a cam handle terminating in a cam having a fulcrum point attached to the cam fulcrum and a curved guide path disposed a suitable distance away from the fulcrum point. Moving means i.e. toggle roller in the path are connected to telescoping cylinder 60 by a toggle pin. The movement of the cam handle to and away from the cylinders causes the path to be angularly displaced about the fulcrum point. This in turn causes the toggle roller and toggle pin to travel axially causing in turn axial displacement between the fixed and telescoping cylinders.

Although the present invention has been described in conjunction with preferred embodiments, it is to be understood that modifications and variations may be resorted to without departing from the spirit and scope of the invention as those skilled in the art will readily understand.

I claim:

1. In an apparatus for use at a work station in a fluid flow line for inserting a filter in the flow line which filter has an inner passage for the flow therethrough of the flow line fluid, the filter being inserted between first and second hollow line segments of the flow line,
    (a) a hollow fixed inner cylinder leading to said first hollow line segment and a hollow telescoping outer cylinder disposed over said fixed cylinder for axial movement with respect thereto, said telescoping cylinder having an inlet facing away from said first hollow line segment. the inlet having an end face adapted to tightly engage a corresponding end face outlet on said filter inserted between said line segments and form a fluid-tight seal between said inlet and outlet, bellows means secured to and extending between said cyinders maintaining a constant fluid seal therebetween during axial movement of the telescoping cylinder;
    (b) rigid extension means forming a solid yoke between line segments, the yoke extending between the fixed cylinder and the second hollow line segment separating said segments rigidly and defining a work station for insertion of the filter thereat; and,
    (c) cam means engaging said telescoping cylinder for axially moving said telescoping cylinder so as to engage and disengage said telescoping cylinder inlet end face with said filter outlet.

2. An apparatus as claimed in claim 1, said fixed cylinder including a large boss on the end thereof toward said first hollow line segment and a narrower neck on the other end thereof, the telescoping cylinder sliding over the neck until abutting against said boss.

3. An apparatus as claimed in claim 1, said cam means including a cam fulcrum on said fixed cylinder, a cam handle terminating in a cam having a fulcrum point attached to said cam fulcrum and a curved guide path disposed at a suitable distance away from said fulcrum point, moving means in said path connected to said telescoping cylinder, whereby the movement of said handle to and away from said cylinders causes said path to be angularly displaced about the fulcrum point so as to cause the moving means to travel axially and in turn causes axial displacement between the fixed and telescoping cylinders.

4. An apparatus for use at a work station in a fluid flow line for inserting a filter at the work station, said apparatus having first and second hollow cylindrical sections, and apertures at both extremities for connection with the line, comprising in combination;
    (a) a solid yoke rigidly separating the two sections defining the work station for the insertion of said filter thereat;
    (b) said first section having an outlet facing the yoke, said outlet having an end face so constructed as to match a corresponding inlet end face on said filter inserted between said sections to form a fluid-tight seal;
    (c) said second section including a hollow fixed inner cylinder and a telescoping outer cylinder disposed over said fixed cylinder for axial movement with respect thereto, said telescoping cylinder having a secont section inlet facing the yoke, said inlet having an end face so constructed as to match a corresponding outlet on said filter inserted between the sections to form a fluid-tight seal, bellows means connected between said fixed and telescoping cylinders and secured thereto maintaining a constant fluid seal therebetween during axial movement of the telescoping cylinder; and
    (d) cam means engaging said telescoping cylinder for axially moving the telescoping cylinder to engage and disengage the inlet end face of the telescoping cylinder from the outlet of the filter.

5. An apparatus as claimed in claim 4, said cam means including a cam fulcrum on said fixed cylinder, a cam handle terminating in a cam having a fulcrum point attached to said cam fulcrum and a curved guide path disposed at a suitable distance away from said fulcrum point, moving means in said path connected to said telescoping cylinder, whereby the movement of said handle to and away from said cylinders causes said path to be angularly displaced about the fulcrum point so as to cause the moving means to travel axially and in turn causes axial displacement between the fixed and telescoping cylinders.

References Cited

UNITED STATES PATENTS

| | | | |
|---|---|---|---|
| 1,519,097 | 12/1924 | Kraft | 285—332 X |
| 3,240,342 | 3/1966 | Callahan et al. | 210—450 X |
| 3,300,235 | 1/1967 | Blackwell | 285—326 X |

FOREIGN PATENTS

| | | |
|---|---|---|
| 759,306 | 5/1954 | Great Britain. |
| 687,376 | 5/1964 | Canada. |

REUBEN FRIEDMAN, Primary Examiner

T. A. GRANGER, Assistant Examiner

U.S. Cl. X.R.

210—447